April 17, 1945.    H. T. JARVIS    2,373,685
IGNITION TIMING SYSTEM
Filed Dec. 23, 1942
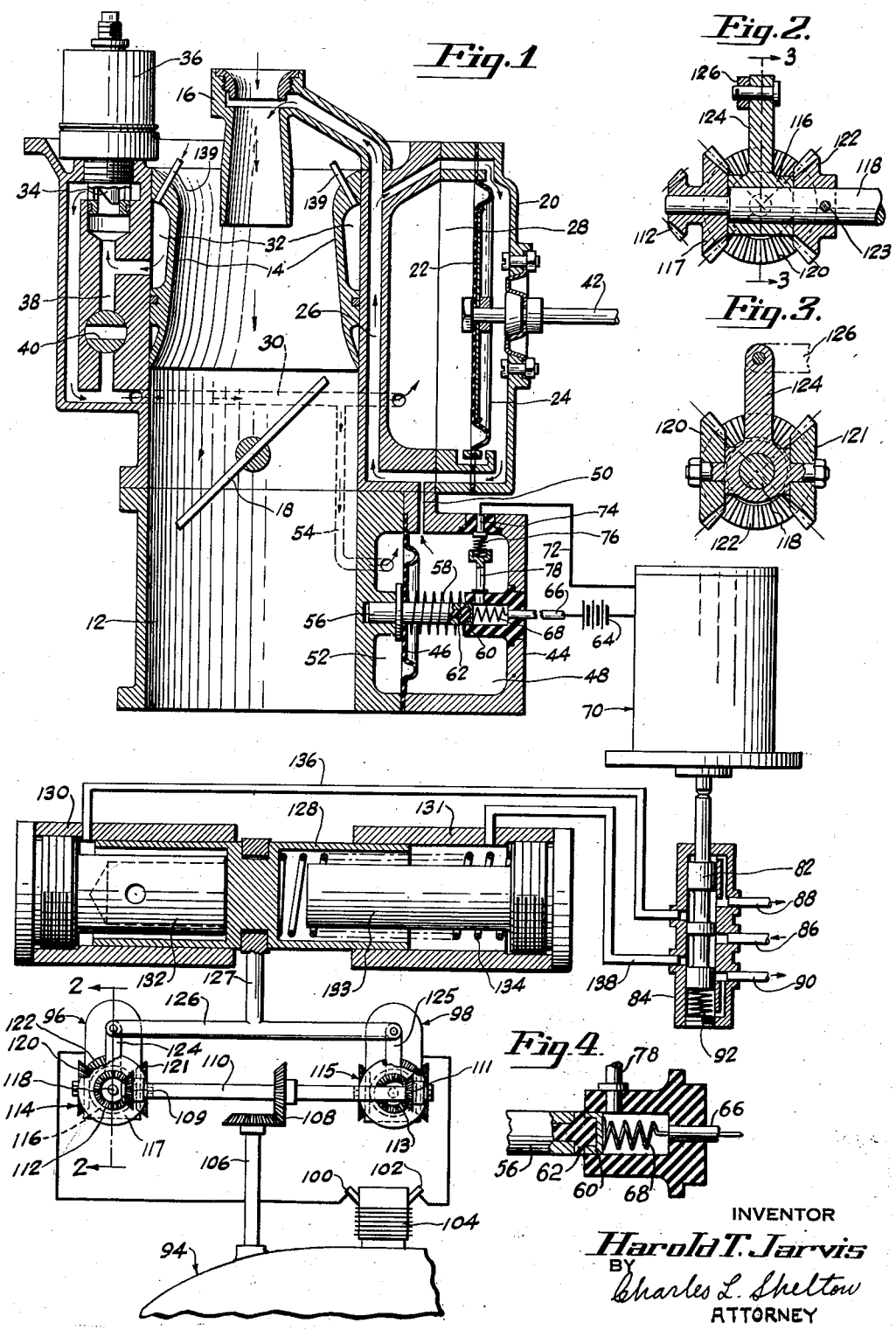
INVENTOR
*Harold T. Jarvis*
BY
*Charles L. Shelton*
ATTORNEY Patented Apr. 17, 1945

2,373,685

UNITED STATES PATENT OFFICE 2,373,685

IGNITION TIMING SYSTEM

Harold T. Jarvis, Manchester, Conn., assignor to United Aircraft Corporation, East Hartford, Conn., a corporation of Delaware Application December 23, 1942, Serial No. 469,930

9 Claims. (Cl. 123—117)

This invention relates to improvements in automatic spark advance controls and has particular reference to an improved apparatus for controlling the spark advance of an internal combustion engine equipped with an intake air flow measuring device.

An object of the invention resides in the provision of an improved apparatus which controls the ignition timing in accordance with the flow of intake air to the engine.

A further object resides in the provision of improved apparatus which has sufficient power to adjust the setting of ignition spark producing magnetos.

A still further object resides in the provision of an improved ignition timing control apparatus which will provide a predetermined spark setting for starting, idling and full-power operation of the engine and will provide a spark setting advance from said predetermined setting for medium power operation of the engine corresponding to the cruising power operation of an aircraft engine.

An additional object resides in the provision of a simple, light-weight, dependable automatic ignition timing control apparatus of the character indicated.

Other objects and advantages will be apparent from the specification and claims and from the accompanying drawing which illustrates what is now considered to be a preferred embodiment of the invention.

In the drawing

Fig. 1 is a somewhat schematic view of an ignition timing control apparatus constructed according to the invention.

Fig. 2 is a detail sectional view on the line 2—2 of Fig. 1.

Fig. 3 is a view on line 3—3 of Fig. 2.

Fig. 4 is an enlarged sectional view of the switch mechanism of Fig. 1.

It has long been known that different ignition timing settings are required for efficient engine operation at different operating conditions. For example, it is known to be desirable to provide a retarded ignition timing setting for starting the engine and for engine idling operation, and it is also known that retarding the ignition timing or spark advance will usually prevent detonation. Since the best engine economy occurs with an ignition timing setting advanced to a position just below that at which detonation starts, and since detonation occurs at a more retarded spark setting at full engine power than at medium or cruising power, it is desirable to maintain an advanced spark setting during such medium or cruising power operation and to provide a retarded spark setting at or near full power operation. Since the rate of flow by weight or mass of engine intake air varies very closely in direct proportion to the engine power output, it has been found that an ignition timing control apparatus actuated by the mass or weight flow rate of engine intake air can be made to operate in the desirable manner described above.

In the drawing, the engine carburetor has an air intake duct 12 provided with a restriction in the form of a venturi 14. Within venturi 14 is a small auxiliary venturi 16 having its exit end at or near the throat or maximum restriction of the main venturi 14. Beyond venturi 14 in the direction of airflow is the throttle valve 18 for controlling the engine air intake.

At one side of the carburetor is provided a chamber 20 within which is a diaphragm 22 dividing the chamber into two compartments 24 and 28. Compartment 24 is connected through a passage 26 with the throat portion of the auxiliary venturi 16, while compartment 28 is connected through a passage 30 with an annular channel 32 surrounding the main venturi 14 and provided with impact tubes 139. Passage 30 is intersected by a throttling valve 34 actuated by density responsive element 36 positioned in the air intake scoop or duct ahead of venturis 14 and 16. With this arrangement passages 26 and 30 impose on the opposite side of the diaphragm 22 an air pressure differential proportional to the flow of air through the Venturi ducts and this differential is corrected for density variations by valve 34 and density responsive element 36 in a manner well known to the art, to render the pressure differential acting on diaphragm 22 proportional to the weight or mass of air flowing through the venturi per unit of time. For instance, in a typical installation, the compensated pressure differential across diaphragm 22 will be a function of the number of pounds per hour of intake air flow. The throttling valve 34 may be by-passed by means of an auxiliary passage 38 controlled by a valve 40 which may be manually operated. A movable rod 42 is connected with diaphragm 22 and may be connected at its opposite end with a fuel flow control device, not illustrated but well known in the art, in order to proportion the amount of fuel supplied to the engine to the quantity of air as measured in weight or mass of air flowing per unit of time.

A second chamber 44, forming part of the present invention, is provided at one side of the carburetor and divided into two compartments 48 and 52 by a diaphragm 46. Compartment 48 is connected through an auxiliary passage 50 with passage 26, and compartment 52 is connected through auxiliary passage 54 with passage 38, so that a pressure differential is imposed on diaphragm 46 which is also proportional to the quantity of air flowing to the engine through ducts 14, 16 and 12. A plunger 56 is slidably mounted in chamber 44 and is connected to the center of diaphragm 46 for movement by the diaphragm under the influence of the above mentioned pressure differential. The plunger has a terminal position, as illustrated, to which it is resiliently urged by compression spring 58 and from which it is moved by the diaphragm when the pressure exerted on the left side of the diaphragm exceeds the pressure exerted on the right side of the diaphragm plus the force exerted by spring 58. The right hand end of plunger 56 carries a contact ring 60 insulated from the plunger by an insulating plug 62. Ring 60 is electrically connected with a source of electrical energy, such as the battery 64, through conduit 66 and flexible connection 68. The opposite side of the battery is connected to a solenoid generally indicated at 70 and the opposite side of the solenoid is connected, through conductor 72, with a fixed terminal 74 which is, in turn, connected through compression spring 76 with a contact member 78 at right angles to plunger 56 and so positioned that its end contacts ring 60 when plunger 56 has been moved a predetermined distance by diaphragm 46. When the plunger moves beyond the above-mentioned predetermined distance the contact ring is moved beyond the end of the member 78 and the circuit is broken, as will be apparent from an inspection of the drawing (Figs. 1 and 4).

Solenoid 70 is operatively connected with a valve comprising a plunger 82 reciprocably mounted in a cylinder 84. A fluid conduit 86 supplies fluid under pressure, such as engine lubricating oil, to one side of the cylinder and two drain channels 88 and 90 lead from the same side thereof to a sump. Plunger 82 is urged in one direction by compression spring 92 and is moved in the opposite direction by solenoid 70 acting with a force greater than that exerted by the spring.

The engine, generally indicated at 94, is also equipped with one or more magnetos, as generally indicated at 96 and 98, electrically connected with the engine spark plugs, two of which are indicated at 100 and 102, mounted in the engine cylinder 104.

Magnetos 96 and 98 are driven from the engine by means schematically illustrated in Fig. 1, comprising an engine driven shaft 106, gears 108, shaft 110 and adjustable gear trains indicated at 114 and 115. Shaft 110 has at its ends bevel gears 109 and 111 which mesh respectively with gears 112 and 113 of the two magneto drive gear trains 114 and 115.

As the two gear trains are similar in all respects, a description of only one of them will be sufficient for the present purpose. Gear 112 is rigidly secured to an oppositely beveled gear 117 (Fig. 2) supported for free rotation on the outer end of magneto drive shaft 118. Gear 117 meshes with a pair of idler gears 120, 121 carried by a cage 116 supported on shaft 118, which is freely rotatable therein. These idler gears mesh with a drive gear 122 fixed on 118 by pin 123. The drive is therefore from shaft 118 through gears 109 and 112 to gear 117 and thence through idler gears 120 and 121 to gear 122. With this arrangement it is apparent that rotation of cage 116 about shaft 118 will angularly displace gear 122 relative to gear 117, resulting in an angular displacement of shaft 118 relative to engine driven shaft 106, and a consequent change in the timing of the magneto driven by shaft 118.

Rotational movement of the cages of both magneto drives, about the magneto drive shafts, is controlled by a servo device comprising a double ended piston 128 slidable in axially aligned cylinders 130 and 131 and connected with the cages of the magneto gear trains by a yoke 127 and a cross bar 126 pivotally connected at its ends to two arms 124 and 125 extending radially from the idler gear cage 116 of gear trains 114 and 115 so that movement of piston 128 will effect a change in the timing of the magnetos.

Within cylinder 131 is a compression spring 134 which urges piston 128 towards its spark retarding position against the end of a stop 132 in cylinder 130 and telescopically associated with hollow piston 128. A similar stop 133 in cylinder 131 limits the movement of the piston in the spark advancing direction. Stops 132 and 133 are integral with the screw plugs which close the ends of cylinders 130 and 131.

Cylinders 130 and 131 are connected with valve 84 through fluid conduits 136 and 138.

The operation of the device is as follows:

When the engine is not operating, and there is consequently no oil pressure in 86, magnetos 96 and 98 will be set at their limiting spark retarding position by the spring 134. The magnetos will stay in this spark retarding position during starting and idling operation of the engine because a low airflow through duct 12 is not sufficient to move diaphragm 46 far enough to make electrical contact between members 60 and 78, and when no contact is made solenoid 70 is not energized and spring 92 holds valve 82 in such position as to furnish pressure oil from supply passage 86 to passage 138 which holds piston 128 in retarded position. When the engine power is increased to a point at which the airflow through the Venturi tubes 14 and 16 and duct 12 creates a sufficient pressure differential on diaphragm 46 the diaphragm moves plunger 56 to the right to bring ring 60 into contact with member 78. Preferably, the parts are so designed and calibrated that this event occurs when the engine reaches the lower limit of its cruising power range of power operation.

Energization of solenoid 70 will move valve plunger 82 against spring 92 to cut off drain line 88 from, and connect the pressure line 86 with, conduit 136 leading to cylinder 130. This will force piston 128 to the right to advance the spark setting of the magnetos. At the same time valve plunger 82 connects conduit 138 with drain line 90 to vent fluid from cylinder 131. The engine will continue to operate at the advanced spark setting as long as cruising power is maintained. However, if the power is advanced beyond the cruising range, as for take-off or climb, the increased airflow to the engine will apply to diaphragm 46 a pressure differential sufficient to move plunger 56 to a position in which ring 60 passes beyond contact member 78 thereby deenergizing solenoid 70 and permitting valve plunger 82 to move under the influence of spring 92 to connect pressure line 86 with conduit 138 and conduit 136 with drain line 88. This will cause the piston 128 to move to the left, as viewed in the drawing, to retard the spark setting of the magnetos.

There is thus provided an automatic ignition timing control having two definite predetermined positions, that is, a spark retarding position for low power operation such as starting and also for extremely high power operation such as take-off and climb, and a spark advanced position for the cruising power range of the engine, the timing mechanism being automatically set for one or the other of these positions in accordance with the quantity of engine intake air flowing to the engine carburetor.

It is to be understood that the invention is not limited to the specific embodiment herein illustrated and described, but may be used in other ways without departure from its spirit as defined by the following claims:

I claim:

1. An ignition timing control for an internal-combustion engine having engine driven ignition spark producing means and a device for establishing an air pressure head which is a measure of the mass rate of flow of engine intake air for all engine operating conditions comprising, servo-mechanism operatively associated with said spark producing means for changing the timing thereof and including a solenoid, a diaphragm subject to said pressure head, and a switch actuated by said diaphragm and connected with said solenoid to control the energization thereof.

2. An ignition timing control for an internal-combustion engine having engine driven ignition spark producing means and a device for establishing an air pressure head which is a measure of the mass rate of flow of engine intake air for all engine operating conditions comprising: servo-mechanism operatively associated with said spark producing means for changing the timing thereof and including a solenoid, a diaphragm subject to said pressure head, a spring acting against said diaphragm in opposition to said pressure head, and a switch actuated by said diaphragm and connected with said solenoid to energize said solenoid at a predetermined mass rate of intake air flow.

3. An ignition timing control for an internal-combustion engine having engine driven ignition spark producing means and a device for establishing an air pressure head which is a measure of the mass rate of flow of engine intake air for all engine operating conditions comprising: servo mechanism operatively associated with said spark producing means for changing the timing thereof and including a solenoid, a closed chamber pneumatically connected across said pressure head establishing device, a diaphragm in said chamber subject to said pressure head, a spring opposing the action of said pressure head on said diaphragm, and a switch actuated by said diaphragm and connected with said solenoid to energize said solenoid and thereby advance the timing of said spark producing means at a predetermined mass rate of intake air flow.

4. An ignition timing control for an internal-combustion engine having engine driven ignition spark producing means, and a device for establishing an air pressure head which is a measure of the mass rate of flow of engine intake air comprising: servo-mechanism operatively associated with said spark producing means for changing the timing thereof and including a solenoid, a closed chamber pneumatically connected across said pressure head establishing device, a diaphragm in said chamber subject to said pressure head, a spring opposing the action of said pressure head on said diaphragm, and a switch actuated by said diaphragm and connected with said solenoid to energize said solenoid and thereby advance the timing of said spark producing means at a predetermined mass rate of intake air flow, said switch having a limited contact range relative to movement of said diaphragm whereby said solenoid is de-energized when said air flow rate exceeds said predetermined rate by a predetermined amount.

5. An ignition timing control for an internal-combustion engine having engine driven ignition spark producing means and a device for establishing an air pressure head which is a measure of the mass rate of flow of engine intake air comprising: servo-mechanism operatively associated with said spark producing means for changing the timing thereof and including a solenoid, a diaphragm subject to said pressure head, and a switch actuated by said diaphragm and connected with said solenoid to control the energization thereof, said switch having two open and one closed position and movable from the first open position to the closed position by an increase in the mass rate of air flow to a predetermined rate and movable from the closed position to the second open position by an increase in the mass rate of air flow to a rate above said predetermined rate.

6. An ignition timing control for an internal-combustion engine having engine driven ignition spark producing means and a device for establishing an air pressure head which is a measure of the mass rate of flow of engine intake air comprising: servo-mechanism operatively associated with said spark producing means for changing the timing thereof and including a solenoid, a diaphragm subject to said pressure head, and a switch actuated by said diaphragm and connected with said solenoid to control the energization thereof, said switch having a fixed and movable contact, said movable contact being actuated by said diaphragm to move it into the electric conducting relationship with said fixed contact upon a predetermined increase in the mass rate of flow of engine intake air and being movable past said fixed contact and out of electric conducting relationship by a predetermined further increase in the mass rate of flow of engine intake air.

7. In combination with an engine having electric ignition mechanism and having an idling range, a cruising range and a full power range of power operation, timing means for said ignition mechanism operative to retard the ignition timing for said idling range and said full power range and advance said ignition timing for said cruising range, said timing means including means urging said timing means to retarded position, means including a switch operative to move said timing means to advanced position when said switch is closed, and switch operating means responsive to variations in the mass rate of engine intake air flow to maintain said switch open when said engine is operating in said idling range or said full power range, and close said switch when said engine is operating in said cruising range.

8. An electrical ignition type internal combustion engine having adjustable engine driven spark producing means and means for establishing an air pressure head which is a measure of the mass rate of flow of engine intake air at all engine altitudes, characterized by the provision of servo means including a solenoid operatively connected with said spark producing means to adjust the timing thereof and a switch actuated by said pressure head and electrically connected with said solenoid to control the energization thereof.

9. An automatic ignition timing apparatus for an internal combustion aircraft engine comprising, mechanism for changing the ignition timing of said engine, means for establishing a fluid pressure differential which is a measure of the mass rate of flow of charging fluid to said engine at all engine altitudes, and a device responsive to variations in said pressure differential and operatively associated with said timing mechanism for first advancing and then retarding the ignition timing of said engine as said mass rate of flow continuously increases from the idling to the full power range of engine operation.

HAROLD T. JARVIS.